Nov. 18, 1930. D. G. ROOS 1,781,705
STEERING MECHANISM
Filed March 22, 1928 2 Sheets-Sheet 2

INVENTOR.
Delmar G. Roos
BY
P. W. Pomeroy
ATTORNEY

Patented Nov. 18, 1930

1,781,705

UNITED STATES PATENT OFFICE

DELMAR G. ROOS, OF SOUTH BEND, INDIANA, ASSIGNOR TO THE STUDEBAKER CORPORATION, OF SOUTH BEND, INDIANA, A CORPORATION OF NEW JERSEY

STEERING MECHANISM

Application filed March 22, 1928. Serial No. 263,905.

This invention relates to the steering mechanism of motor vehicles and particularly to steering arms therefor.

One of the characteristics of motor vehicles since the advent of the so-called "balloon tires" is shimmy. The shimmying movement in the steering mechanism is a result to a great extent, of the transfer of the movement of one of the road wheels caused by certain forces acting thereon to the other road wheel in which similar forces are present and which are in phase with those forces acting upon the first-mentioned wheel. These forces acting in combination and in the same phase, build up to such an extent that they cause the wheels to vibrate rapidly about their king pins as axes. In conventional constructions the vibratory movement of one of the wheels is transmitted directly to the other wheel through a rigid cross tube connected to the steering arms which are rigidly secured to the steering knuckles. If the vibratory movement of one of the road wheels is not in phase with the vibratory movement of the other of the wheels, the driver of the vehicle will not notice this action because the action of one wheel counteracts the action of the other with the effect of substantially neutralizing the combined effect of both. However, when the action of one wheel comes in phase with the action of the other, the forces tending to produce the vibratory movement combine and build up to such an extent that the entire steering mechanism and parts carried thereby are affected.

In many cases wherein violent shimmy occurs, the entire forward end of the motor vehicle is violently vibrated with the result that many of the parts are loosened and in many cases, broken. It has been found from a considerable number of experiments that if the forces tending to produce shimmy in one of the steering wheels are prevented from combining with similar forces in the other wheel, practically no apparent shimmy will be produced. It has been suggested that the cross tube be eliminated and a separate steering gear be provided for each wheel in order to obtain these results, but the resulting cost and apparent multiplicity of parts makes this method impractical. It is therefore, the principal object of this invention to provide a motor vehicle with means for preventing the vibratory movement of one of the road wheels from being transferred through the steering cross tube to the other road wheel.

Another object is to provide a motor vehicle with a resilient connection between the road wheels thereof whereby shimmying of the same is eliminated by preventing the forces tending to vibrate one wheel from being transferred to the other wheel.

Another object is to provide a motor vehicle with means for eliminating shimmy of the road wheels comprising a resilient connection between one of the steering arms and its adjacent steering knuckle whereby one of the wheels may have pivotal movement relative to the other.

A further object is to provide a motor vehicle with means for eliminating shimmy of the road wheels comprising a bracket secured to one of the steering knuckles having a pair of spaced springs, and a steering arm pivoted to the bracket midway between the springs so as to have contact therewith, the free ends of the steering arm being connected to an end of the steering cross tube whereby one of the wheels may have pivotal movement relative to the other.

These being among the objects of the present invention the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a plan view of the forward end of a motor vehicle showing the steering mechanism thereof.

Figure 4 is an enlarged section taken on the line 4—4 of Figure 5 showing the pivotal connection between the steering arm and bracket.

Figure 5 is a section taken on the line 5—5 of Figure 4 showing one of the springs and one of the stop members, which limits the amount of movement of the steering arm relative to the steering wheel.

Figure 1:
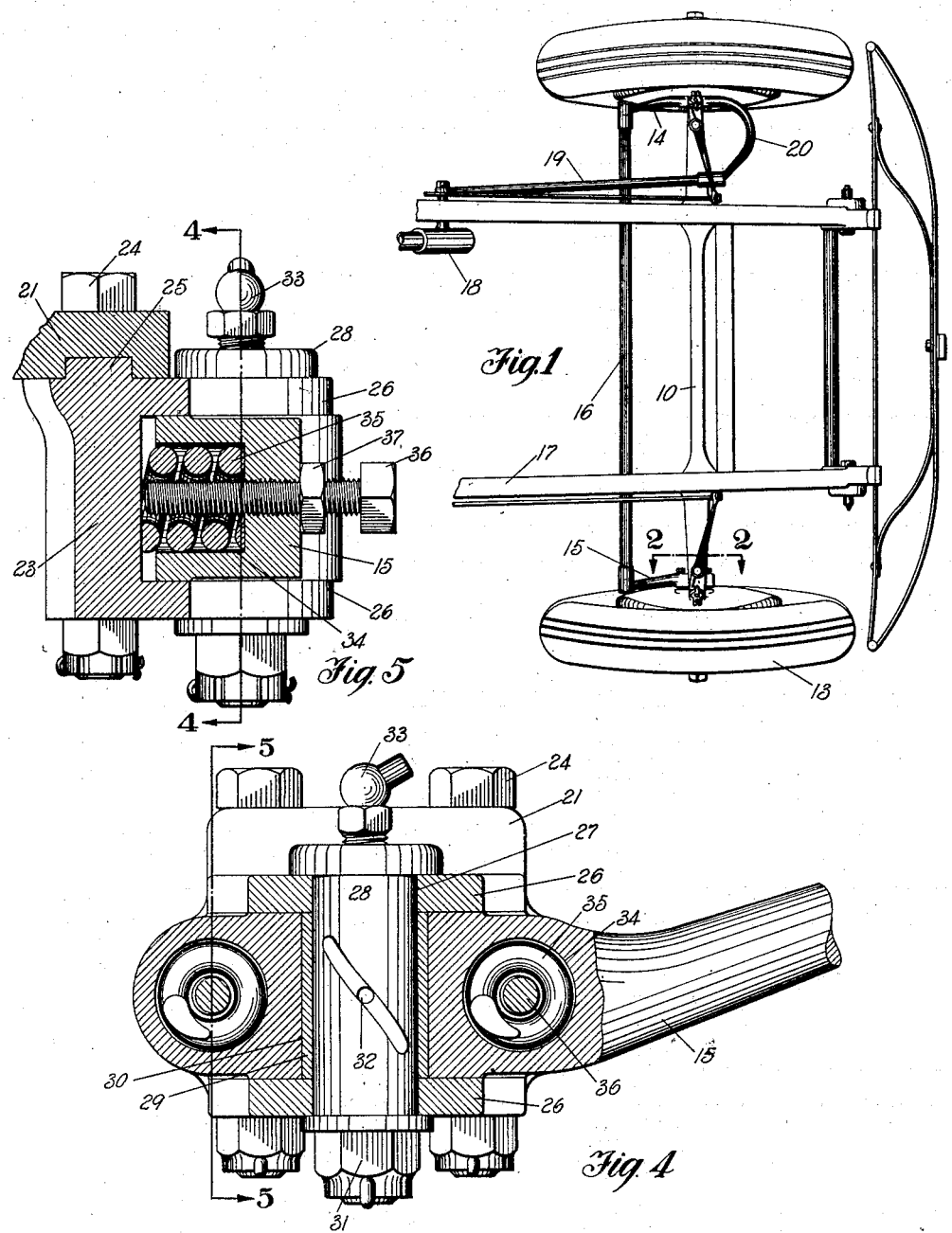

Referring to the accompanying drawings in which like numerals refer to like parts throughout the several views, the motor vehicle has a front axle 10 to the ends of which the steering knuckle 11 are pivotally secured by king pins 12. Each steering knuckle 11 rotatably carries an adjacent road wheel 13 and one of the same is provided with the conventional steering arm 14. The other steering knuckle 11 is provided with a steering arm 15 of the present invention which will be presently described. The free ends of the steering arms 14 and 15 are interconnected by conventional ball and socket joints to a steering cross tube 16. The front axle assembly just described is secured in a conventional manner to the vehicle frame side rails 17, one of which carries the steering mechanism 18. The steering mechanism 18 is connected by means of a drag link 19 to the free end of an arm 20 which is secured to one of the steering knuckles 11.

Figure 2:
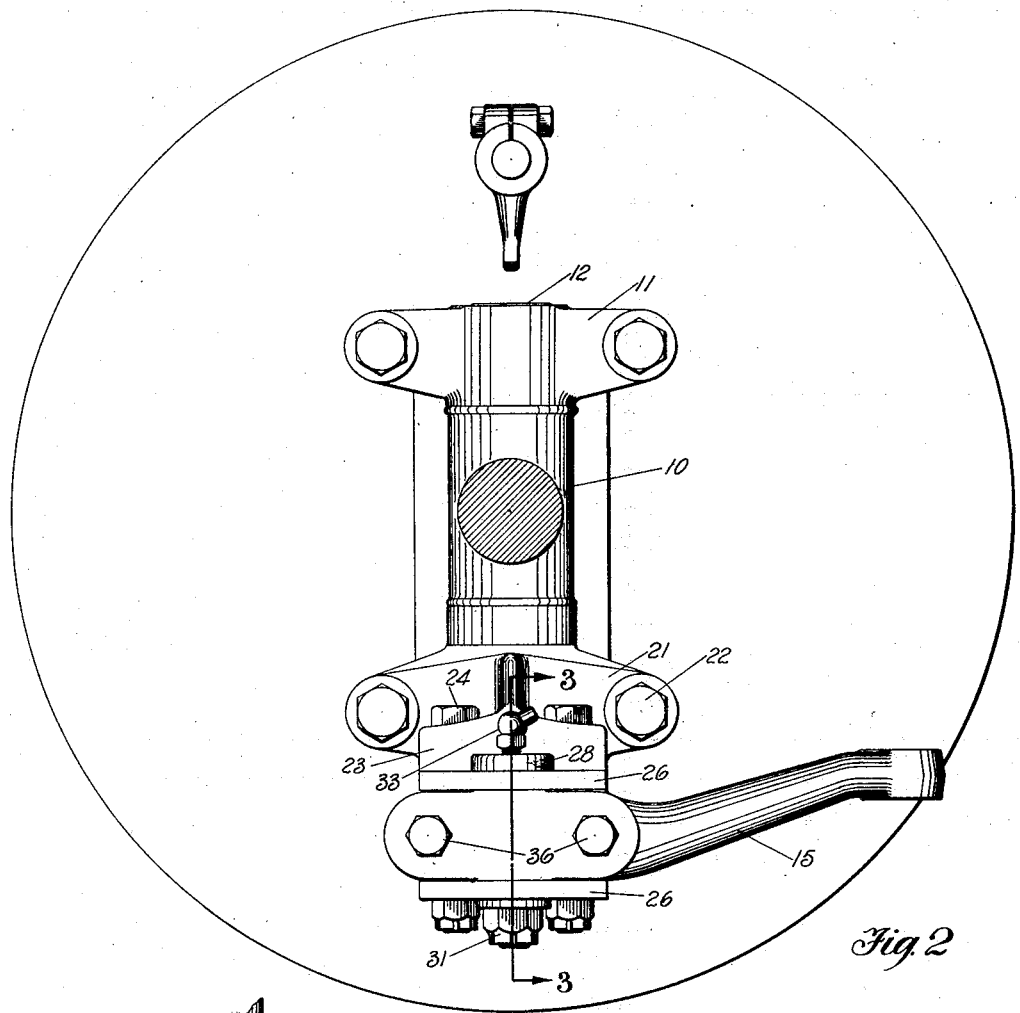
Figure 2 is an enlarged section taken approximately on the line 2—2 of Figure 1 showing the steering arm secured to the steering knuckle.
Figure 3:
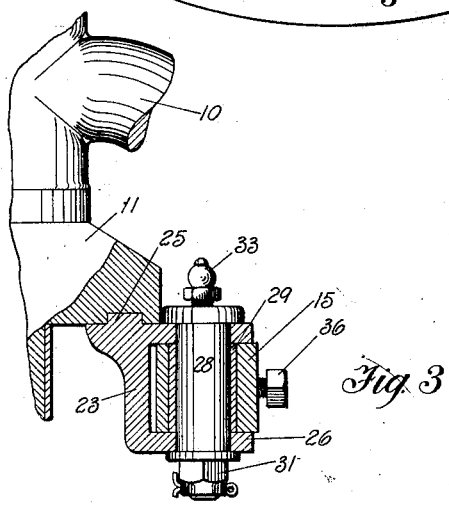
Figure 3 is a section taken approximately on the line 3—3 of Figure 2.

Referring to Figures 2 to 5 inclusive, an angle-shaped bracket 21 is secured by bolts 22 to the lower end of the steering knuckle 11 and a U-shaped member 23 is secured by bolts 24 to the bracket 21. The U-shaped member 23 is preferably provided with a rectangular-shaped rib 25 extending across its upper horizontal face which is received in a correspondingly-shaped groove formed in the lower face of the bracket 21 to absorb the stresses produced by pivoting of the steering knuckles 11 and to prevent the stresses from being carried entirely by the bolts 24.

One end of the steering arm is telescopically received between the legs 26 of the U-shaped member 23 and is pivoted by means of a pin 28 extending through axially-aligned openings 27 in the legs 26 and through a bushing 29 which is positioned in a central opening 30 formed in the base of the steering arm 15. The pin 28 is held against movement by a nut 31 threaded thereon and is also provided with a lubricant passageway 32 to which lubricant is conducted through a cup 33 or similar device positioned in the upper end of the pins 28 so that the arm 15 may freely pivot about the pin 28 as an axis with as little friction as possible.

The base of the steering arm 15 is formed with a pair of spaced cylindrical depressions 34, one being positioned at each side of the pivot pin 28, which receive coil springs 35 of the proper dimensions. The coil springs 35 seat against the base of the U-shaped member 23 between the legs 26 thereof and are always in compression so that when the arm 15 is pivoted they will always cause the arm 15 to be returned to its normal position.

Screws 36 threaded in the base of the steering arm 15 extend centrally through the depressions 34 thereof within the springs 35 and the ends thereof are spaced from the bottom of the U-shaped member 23. Lock nuts 37 are threaded on the screws 36 to lock the same against rotation so that a constant distance will be maintained between the ends of the screws 36 and the bottom of the U-shaped member 23. One or the other of the screws 36 abuts against the bracket 23 when the arm 15 is pivoted to prevent excessive pivotal movement of the steering arm 15 about the pin 28.

The springs 35 are preferably designed so that under normal conditions no pivotal action of the lever 15 relative to the steering knuckle 11 results, and so that they constrain the wheels 13 to relative equal movement with each other. However, when the wheels 13 are acted upon by gyroscopic or other forces which when combined in phase cause shimmy, the forces in one of the wheels 13 in attempting to be transmitted to the other wheel through the cross tube 16 pivots the one wheel only and are absorbed by the springs 35 with the result that the opposite wheel and knuckle remain stationary. When the other wheel is acted upon by forces tending to cause shimmy, the action is carried through to the arm 15 which pivots about the pin 28, and the opposite wheel remains stationary. These forces then are not transmitted to the other wheel or at least to such a small extent that the effect thereof will be negligible. The forces in one of the wheels 13 tending to cause shimmy are divorced in this manner from the forces in the other wheel and these forces therefore are prevented from combining and building up to a sufficient extent to cause the violent vibratory movement commonly known as "shimmy".

It is to be understood, however, that formal changes may be made in the specific embodiment of the invention described without departing from the spirit and substance of the broad invention, the scope of which is commensurate with the appended claims.

What I claim is:

1. The combination with the road wheels and steering cross tube of a motor vehicle, of means connecting one of said wheels with said cross tube comprising a bracket rigidly secured on the steering knuckle of said wheel, an arm pivotally connected with said cross tube pivotally supported in said bracket for permitting pivotal movement of one of said wheels relative to the other wheel, and means between said arm and bracket positioned on each side of the pivotal axis of said arm for normally constraining said wheels to equal pivotal movement.

2. In combination with the road wheels and steering cross tube of a motor vehicle, of means resiliently connecting one of said wheels with said cross tube comprising a bracket rigidly secured on the steering knuckle of said wheel, an arm pivotally connected with said cross tube and pivotally connected in said bracket permitting relative pivotal movement between said wheels, and stop members for limiting the degree of said movement, and means between said arm and bracket positioned on each side of the pivotal axis of said arm for normally constraining said wheels to equal pivotal movement.

3. The combination with the road wheels and steering cross tube of a motor vehicle, of means resiliently connecting one of said wheels with said cross tube comprising a U-shaped bracket rigidly secured to the steering knuckle of said wheel, a steering arm connected with said cross tube and pivotally connected in said bracket for allowing relative pivotal movement between said wheels, and spring means at each side of the pivotal axis of said arm positioned between said arm and bracket for normally constraining said wheels to equal pivotal movement.

4. The combination with the road wheels and steering cross tube of a motor vehicle, of means resiliently connecting one of said wheels with said cross tube for preventing the transfer of vibratory movement from one of said said wheels to the other wheel comprising a bracket secured to the steering knuckle of one of said wheels, a steering arm connected with said cross tube and pivotally connected with said bracket for permitting relative pivotal movement between said wheels, spring means at each side of the pivotal axis of said arm positioned between said arm and bracket, and stops supported by said arm adapted to engage said bracket to limit the degree of said relative pivotal movement between said wheels.

5. A steering arm for a motor vehicle road wheel comprising a U-shaped support secured to the steering knuckle thereof, a lever pivoted at one end to said support between the legs thereof to permit relative pivotal movement between said wheel and lever, and springs positioned between said support and lever for holding said lever in normal unpivoted position.

6. A steering arm for a motor vehicle road wheel comprising a U-shaped support secured to the steering knuckle thereof, a lever pivoted at one end to said support between the legs thereof to permit relative pivotal movement beween said wheel and lever, said lever being provided with a depression at each side of the pivotal axis thereof, and a coil spring positioned in each of said depressions engageable with said support for holding said lever in normal unpivoted position.

7. A steering arm for a motor vehicle road wheel comprising a U-shaped support secured to the steering knuckle thereof, a lever pivoted at one end between the legs of said support, coil springs positioned at each side of the pivotal axis of said lever normally constraining said lever against pivotal movement, and stop screws threaded through said lever and extending within said springs, said stop screws being adapted to engage said support upon pivotal movement of said lever for limiting the degree of relative pivotal movement between said lever and wheel.

8. A steering mechanism for a motor vehicle road wheel comprising a support extending from the wheel steering knuckle, a steering arm pivotally mounted in said support on a pin having its longitudinal axis substantially parallel with the longitudinal axis of the steering knuckle to provide pivotal movement of said arm relative to said wheel, and means for normally constraining said arm to pivot with said wheel.

9. A steering mechanism for a motor vehicle road wheel comprising a U-shaped support extending from the wheel steering knuckle, an arm pivoted at one end between the legs of said support, the longitudinal axis of the pivot being substantially parallel with the longitudinal axis of the steering knuckle to provide pivotal movement of said arm relative to said wheel, stop members carried by said lever adapted to engage said support to limit said pivotal movement, and means for normally constraining said arm to pivot with said wheel.

Signed by me at South Bend, Indiana, this 15th day of March, 1928.

DELMAR G. ROOS.